Oct. 29, 1935.  J. C. BLACK  2,018,654
PROCESS FOR TREATING OILS
Original Filed Oct. 13, 1926
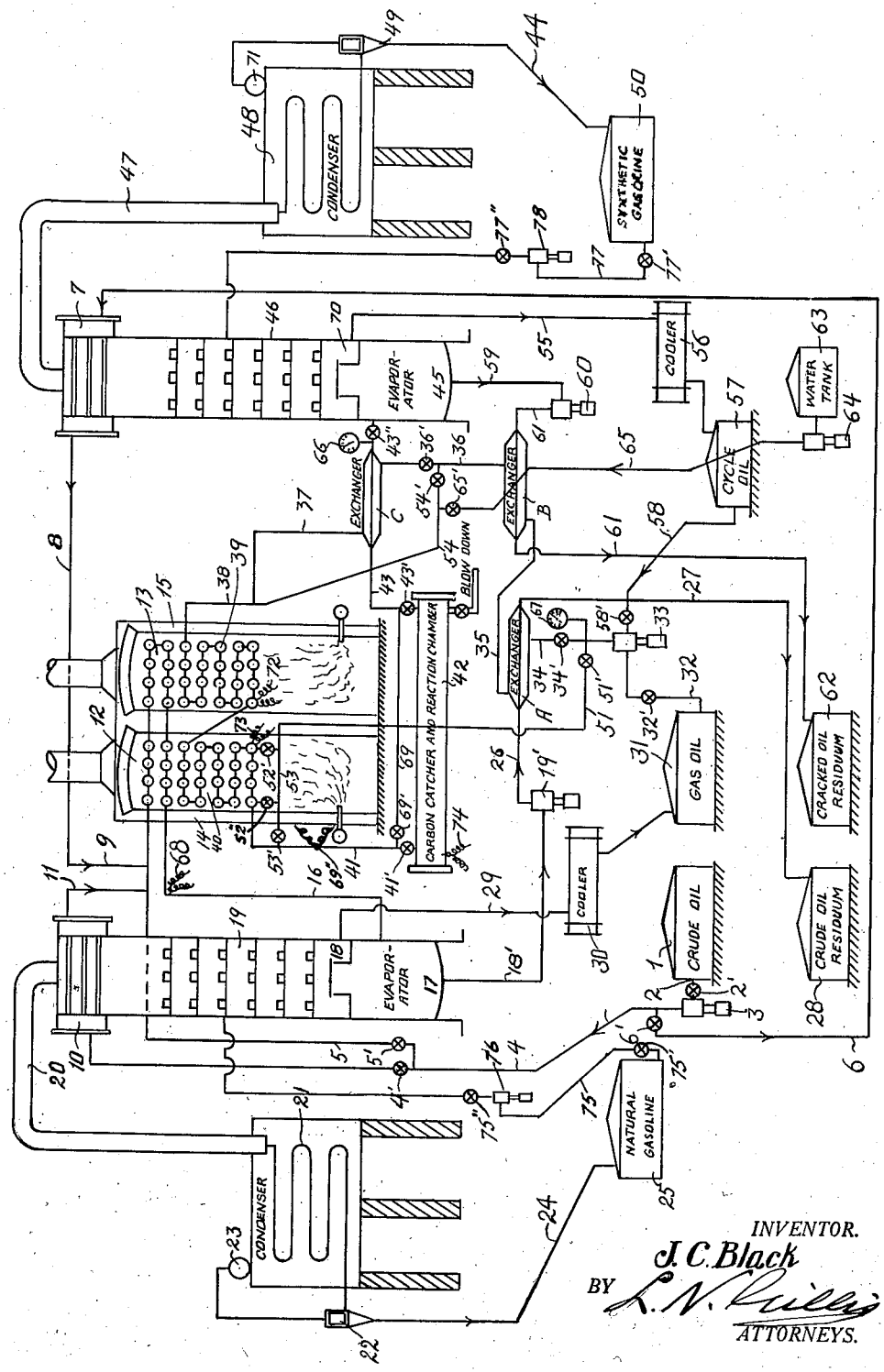
INVENTOR.
J. C. Black
BY
ATTORNEYS.

Patented Oct. 29, 1935

2,018,654

UNITED STATES PATENT OFFICE 2,018,654

PROCESS FOR TREATING OILS

John C. Black, Los Angeles, Calif., assignor to Gasoline Products Company, Inc., Wilmington, Del., a corporation of Delaware Application October 13, 1926, Serial No. 141,419
Renewed November 2, 1932

13 Claims. (Cl. 196—58)

This application is a continuation in part of application, Serial Number 116,217, filed June 15, 1926.

In my Patent 1,456,419, there is described a process for the production of lower boiling point hydrocarbons from those of higher boiling point which comprises preheating the oil in a heating coil to the point of active decomposition and then subjecting the thus heated oil to a further heat treatment where it is maintained at the temperature attained in the preheating coil, or at a higher temperature, and the endothermic heat of the cracking reaction supplied.

In passing through the second heating or cracking coil the hydrocarbons are subjected to the cracking temperature and maintained for a sufficient length of time to obtain the desired cracking effects. The stream of oil is kept under sufficient pressure to prevent substantial vaporization. The hydrocarbons passing from the cracking or reaction coils are then passed either to a carbon settling chamber or reaction chamber for the further decomposition and carbon deposition, or the cracked oil passing from the heating coil may be sent directly through a pressure reducing and discharge valve and from thence immediately into a fractionating apparatus.

The invention which is the subject matter of this application utilizes the general method above outlined, and has for one of its objects the regulation of the thermal and cracking effects which take place in the final passes of the cracking coil. In the previously mentioned application, of which this application is a continuation in part, this regulation may be effected by splitting the heated stream and passing one of the split streams, called the bypass stream, into the final passes of the cracking coil.

Other methods are described whereby oil of any desired temperature, from cold unheated oil to relatively highly heated oil, may be introduced into the final passes. I have found that in operating the process as described in my Patent 1,456,419, that the final passes of the reaction coil tend to foul with carbon and after a period the apparatus has to be shut down and cleaned. I have found by the injection of this oil into the final passes, I obtain a greater yield of decomposed hydrocarbons. I have found also that the fouling of the tubes is very materially lessened by this injection of the oil into the final passes. I have also found that the injected hydrocarbons are themselves partially decomposed by the heat contained in the hydrocarbons of the main stream into which they are injected, and also by the heating effect derived from the furnaces while passing through the final passes of the reaction coil. By this injection of oil the heat absorptive characteristics of the oil stream is modified and heat may be transferred to the oil stream without excessive carbonization resulting.

While I do not limit myself to the theory here advanced, I believe that this theory is a very probable explanation of the phenomena observed. It is apparent that in operating the streams according to my former method, without the injection of oil to the final passes, that the oil, reaching the final passes, will have been highly cracked with a large formation of lighter oils which do not crack easily. The oil stream also contains heavy bodies, probably formed as a result of the cracking reaction. The practical oil man says that the oil becomes "dirty". The oil stream and the fire are manipulated so as to maintain the oil at the chosen cracking temperature. Any transfer of heat that results under the above circumstance goes to carbonize the heavy bodies, depositing a dense carbon on the walls of the tubes. The heat conductivity is thus reduced. The tubes become overheated and the result is that as more oil advances the carbonization at the film between the oil and tubes becomes more and more severe. This is aggravated by the fact that in systems involving counter-current passage of oil and combustion gases in the furnace, the oil in the final passes of the coil comes in contact with the hottest gases.

Another result is that this high temperature cracking which results at the surface of the highly heated tubes causes a formation of a large amount of gas which builds up a high vapor pressure. This pressure, if carried to excess, may exceed the operating pressure employed and cause a serious interference in the operation of the process. The introduction of cold or relatively cold uncracked oil into the final passes avoids the difficulties mentioned above. The injected oil absorbs heat, in having its sensible heat augmented, from the cracked oil entering the final passes, thereby lowering the temperature of the cracked oil and also checking its cracking. The partially cooled stream then absorbs heat from the combustion gases and the tube wall surface to have its temperature raised to substantially the desired cracking reaction. There is, therefore, under these circumstances a large transfer of heat from the combustion gases to the oil passing through the final passes of the coil. The uncracked oil in the stream also absorbs heat due to the endothermic character of the cracking reaction. The tubes are kept from overheating and the excessive carbonization as above described is materially reduced.

Furthermore, by the injection of this relatively cold oil, any carbonaceous material deposited in the reaction is of softer composition and is more readily removed in the blowing down operation and the heaters can be put back on stream with a smaller loss of time. The injected oil should be so controlled that the temperature of the admixed streams may be such that the decomposition of the injected oil is partially accomplished and to obtain a temperature of the mixture such that the decomposition in the main stream is checked and the carbon of decomposition is minimized.

In the operation which forms the subject matter of this application, I prefer to use an unheated oil as the injection oil instead of using a partially heated oil, bypassed from the partially heated main stream. By so doing I can limit the amount of injected oil I need to be much less than if I were to use the above bypassed partially heated stream. I have also found that the cracking effect upon the injected oil is greater when I use cold oil rather than partially heated oil. While I do not wish to be limited by my theory, I believe that this may be due to the sudden raise in temperature occasioned on injection together with the greater range of temperature through which the oil passes. I have termed this phenomenon "shock". I have also found that the control of the process is facilitated.

Another object of my invention is to devise a continuous system wherein crude oil may be converted to gasoline. This process consists essentially of separating a cracking stock from the crude, and decomposing this cracking stock by the process described above, and to be more completely described later. This cracking stock is obtained by distilling the oil by a process involving the heating of the oil in tubes and the evaporation of oil in an evaporator connected to a fractionating device. While this oil may be heated in any desired manner, I prefer to heat the oil by the waste gases coming from the main cracking coils in which the cracking stock is decomposed. The process also involves the control of the fractionation of both the crude oil and cracking material by heat exchange with the cold crude oil.

Another object of this invention is to devise an apparatus for carrying out the process discussed above.

The process and apparatus may be better understood by reference to the accompanying drawing showing systematically an apparatus for carrying out this process.

In the drawing:

1 is a crude oil storage tank. 2 is a transfer line in which there is a valve 2'. This transfer line is connected to a pump 3. 4 is a line leading from pump 3 to analyzer 10. 4' is a valve therein. 11 is a transfer line from analyzer 10 leading to coils 12 and 13 situated in the furnaces 14 and 15, respectively. 16 is a transfer line connecting coil 12 to evaporator 17. 18 is a liquid trap in the bubble tower 19. 20 is a vapor line connecting 19 with the condenser 21. 22 is a look box through which condensate from condenser 21 passes, to be collected in tank 25. 23 is a gas main for removal of uncondensed gases from condenser 21. 5 is a by-pass line controlled by valve 5' for by-passing oil around analyzer 10 direct to coils 12 and 13. Line 6 which is controlled by valve 6' connects pump 3 with analyzer 7 in bubble tower 46 whereby oil may be passed through analyzer 7, and the amount of oil passing to analyzers 7 and 10 controlled. 8 and 9 are transfer lines connecting analyzer 7 to coil 12. Pump 19' takes suction on the liquid in evaporator 17. 26 is a line connecting pump 19' to heat exchanger A. 27 is a line connecting exchanger A to tank 10 28. 29 is a line connecting the liquid trap 18 in bubble tank 17 to cooler 30. 31 is a tank for storing the liquid from cooler 30. 32 is a line connecting the pump 33 to tank 31. 32' is a valve in line 32. 34 is a line leading from pump 33 to heat exchanger A. Line 35 connects exchanger A with exchanger B. Line 34 is controlled by a valve 34'. 36 is a line connecting heat exchanger B with heat exchanger C. 36' is a valve in said line. 37 is a line connecting heat exchanger C with line 38, which line leads to coil 39, situated in furnace 15. 40 is a coil situated in furnace 14 and connected to coil 39. 41 is a cross over line connecting coil 40 to the carbon catcher and reaction chamber 42. 41' is a valve in said line. 43 is a line connecting carbon catcher and reaction chamber 42 with exhanger C and evaporator 45.

I have also shown a cross over connection 69 controlled by valve 69' whereby the carbon catcher and reaction chamber may be by-passed. As a matter of practical construction I prefer to build the apparatus either with or without the carbon catcher, thus avoiding valves 41', 43' and 69', since it is desirable to cut down the number of valves exposed to hot oil. I have merely shown this connection to indicate that the process may be operated with or without carbon catcher. However, this by-pass may be put on as special precautions are taken as to the character of the valves employed.

43'' is a pressure reduction valve in line 43. 46 is a fractionating tower connected to evaporator 45. 70 is a liquid trap in evaporator 45. 47 is a vapor line connecting the fractionating tower and condenser 48. 49 is a look box connected to condenser 48 through which condensate flows from condenser 48 to tank 50. 71 is a gas main for collecting the uncondensed gases rising from look box 49. 55 is a line connecting the liquid trap 50 70 with cooler 56 from which cooled oil passes to tank 57. 58 is a line controlled by valve 58' connecting tank 57 and pump 33. 51 is a line controlled by valve 51' connecting line 34 and the final passes of the reaction coil 40. 52' is a valve controlling the passage of oil from 51 to the final passes of the reaction coil. 52'' is a by-pass valve controlling the passage of oil to the final tube of the final pass of the cracking coil. 53 is a by-pass line connecting line 51 to line 41. Line 53 is controlled by valve 53'. As a matter of practical construction I prefer to eliminate valves 52' and 53' and to build the plant with one of the three alternative methods of oil injection. 54 is a line controlled by valve 54' connecting line 36 to line 38 for by-passing exchanger C. 59 is a line connected to the bottom of the evaporator 45 and also connected to pump 60. 61 is a line connected to pump 60 and passing through exchanger B and leading to tank 62. 63 is a water tank. 65 is a line connecting this water tank to line 54. 64 is a pump in said line and 65' is a valve in said line. 66 is a pressure recorder in line 43 and arranged immediately before valve 43''. 67 is a pressure recorder in line 34 arranged between pump 33 and valve 34'. 68 is a pyrometer located in line 16. 72 is a pyrometer located at the exit point of coil 39. 73 is a pyrometer located at the point of admission of oil passing through valve 52'. 74 is a pyrometer located in the entrance point of the carbon catcher and reaction chamber 42. 69'' is a pyrometer located at the exit point of the cracking coil 40. 75 is a line connecting tank 25 with the upper trays of tower 19. Valves 75' and 75'' and pump 76 controls the passage of condensate in this line. 77 is a line connecting tank 50 with the upper trays in tower 46. 77' and 77'' are valves in said line. 78 is a pump in line 77.

The operation of the process will be understood in connection with the above description. Crude oil is picked up by pump 3. It may be then passed through line 4, analyzer 10, coils 12 and 13, or some or all of it may be by-passed via line 5 direct to coils 12 and 13, depending upon the necessary control required in bubble tower 19. The regulation of the amount of oil passing through the analyzer 10 controls the character of the fractionation in fractionator 19. Oil may also be passed via line 6 to analyzer 7. The amount of oil thus passed controls the character of the fractionation in fractionator 46. Oil from 7 is then passed via 8 and 9 to coils 12 and 13. The oil is heated in coils 12 and 13 by the waste combustion gases rising in furnaces 14 and 15. The temperature of the oil leading from 12 and 13 is controlled in order to obtain the desired temperature at the point indicated by pyrometer 68. This temperature is preferably above 500° F. Since the waste heat gases are usually above 1,000° F., ample heat is obtainable to obtain the desired temperature at point 68. The heated oil then passes to evaporator 17. Unvaporized material is drawn off through line 18' and pump 19' and passed via line 26, through exchanger A and line 27, to the crude oil residue tank 28. Vapor rising through tower 19 is fractionated and the reflux condensate formed is collected in 18, drawn off through line 29, through cooler 30 to the gas oil tank 31.

This middle fractionate is a gas oil which is preferably of a character required for the cracking process. The fractionation and distillation in 17 and 19 is so controlled as to give the desired condensate in 18 to be drawn off as a cracking stock. This is obtained by controlling the temperature of the oil passing to 17 and the quantity of oil passing through analyzer 10 and also by introduction of reflux oil into 19, as for instance condensate from 25, via line 75 and pump 76.

I prefer to use a gas oil as a cracking stock and I have, therefore, marked tank 31 as a gas oil tank. The condensate may, however, be of any desired character, depending upon the needs of the cracking system. Vapors rising in 19 are fractionated as previously described, and uncondensed vapor passes through 20 to be condensed in 21, and condensate collected in 25. This condensate is the natural gasoline content of the crude oil passed through this part of the system.

The oil collected in 31 is picked up by pump 33 together with a portion of cycle oil collected in tank 57, as will be described later. This mixed oil is pumped by pump 33 via line 34 through heat exchanger A, where it abstracts heat from residuum from 17. The oil is then passed through B via 35 where it abstracts heat from residuum from 45, and is then passed through C where it abstracts heat from the cracked oil. A part of the oil may be by-passed around heat exchanger C in order to regulate the heat transfer which occurs in heat exchanger C. The oil is then passed into coil 39 where it is heated up to the reaction temperature by the combustion gases in the furnace, which reaction temperature is marked by pyrometer 72, and then passed through coil 40 where the endothermic heat of the cracking reaction is supplied. The heating in coil 40 is controlled to maintain at least the temperature which was indicated at 72. Preferably this temperature is maintained throughout coil 40 with the modification described later. Coils 39 and 40 may be part of one coil in a single furnace, but I prefer to have them in separate furnaces since this enables a better control of the heating of the coils and the oil passing therethrough.

While I have shown the heating arrangement as based on the countercurrent principle, I do not limit myself to this arrangement, this invention being applicable to any arrangement of coils in a furnace, wherein oil is heated by hot combustion gases.

The oil issuing from the coil 40 is cracked to the desired degree. It may then be passed to the carbon catcher and reaction chamber 42 or passed directly to heat exchanger C. The oil, in passing through exchanger C, is cooled down to the desired temperature in order to obtain the character of evaporation desired in the vaporizer 45. There is a reduction of pressure at the point of the valve 43''. The unvaporized material remains in the vaporizer 45, and the vaporized material passes through 46 to be fractionated. A condensate is formed and collected in 70 and uncondensed material passes through pipe 47 to be condensed in 48 and collected via look box 49 in tank 50. This is the cracked gasoline formed by the process. Uncondensed gases issue from look box 49 into main 71. The condensate collected in 70 is uncracked oil which is recycled via line 55, cooler 56, to tank 57 from which it is picked up, as previously described. This recycle oil is relatively uncracked and is mixed with make up oil, as previously described.

The fractionation in 46 is controlled by oil passage through 7 and may be further controlled by introduction of reflux oil into 46, as for instance, condensate from 50 via pipe 77 by pump 78. The stream passing through line 34 may be split to withdraw a portion of the oil via line 51 to be injected into the final passes of the reaction coil. While I have shown this oil as injected in the last pass, it is understood that this is merely schematic and the oil may be injected in any one of the numerous passes depending how long it is desired that the mixed oils be heated by the combustion gases, and also when it is desired to modify the heat absorptive characteristics of the stream by reducing its temperature and checking the cracking of the heated oil. The amount of oil which is by-passed and injected into the final passes is controlled so that the temperature recorded by pyrometer 73 shall be at the desired point.

Oil may also be injected into the transfer line connected with the carbon catcher when that is employed, or may be also injected in the transfer line 41, even when the carbon catcher is not employed, to control the temperature of the oil passing through line 43. This by-pass of oil via 53 may be employed even when the by-pass via 52' is not employed.

Instead of injecting oil at the outlet of the cracking coil, it may be injected into the final tube or tubes of the final pass of the cracking coil. I have also shown a connection for blowing out the system in order to clear it of any collected carbon. This pump 64 picks up water from tank 63, passes it through line 65, via 65', into line 54, valves 36' and 54' being closed. The water is then passed through coils 39 and 40 and reaction chamber 42, valves 69', 43' being closed and is blown down to a blow-down line as indicated. When the reaction chamber is not employed the blow-down is made via pipe 69 into the evaporator and the water is by-passed to the sewer to avoid contamination of the residuum in 62. This blow-down process is the same as shown in my previously mentioned patent.

In describing the process above I have not set out the different conditions of the valves, since anyone skilled in the art will be able from study of this drawing and the description of the process to understand which valve should be opened and which closed.

The cracking system as above described will produce approximately 35% of synthetic gasoline, 50% of cycle oil to be recycled through the system and 10% of residue and the rest is gas and loss. The crude oil is passed through the coils 12 and 13 at about a pressure of 50 pounds or just sufficient to force the crude oil through the tubing and to the evaporator. The waste heat gases passing up through the furnaces 15 and 14 reach coils 12 and 13 at a temperature of about 1,000°. The oil is heated in the coils, and is passed to the evaporator 17 at a temperature of about 500° F.

I operate this system in such manner that the oil collected in trap 18 and drawn off through line 29 is a gas oil or other desired oil suitable for cracking in the system. This oil, together with the cycle oil, is passed with such a pressure that the recorder 66 will show approximately 1000 pounds, or sufficient to overcome the vapor pressure in the coils so as to ensure a liquid phase condition in the coils. The pump pressure is usually higher than that depending on the frictional resistance of the system, i. e. of the tubes and heat exchanger. Usually this resistance varies from 200 pounds to 500 pounds, depending upon how foul the system is. The oil passing through coils 39 is heated up to the reaction temperature which is chosen for that oil to obtain optimum results. The thus heated oil is passed to coil 40 where it is maintained at the reaction temperature for the desired length of time, the time factor depending upon the speed of the oil and the length and character of the tube. Both these factors are controlled to give the desired cracking effects, that is, to obtain a cracked oil containing the desired amount of low boiling hydrocarbons, and which will give a residue on distillation of the desired viscosity and boiling range and carbon content. The temperatures maintained in the passage through the cracking coil 40 vary between 800° and 900° F., depending upon the oil, and is preferably approximately equal to the temperature of the oil at point 72, but may be higher than that temperature. It is important, however, to supply at least the endothermic heat of the cracking reaction during the passage of the oil through coil 40.

Cold oil is injected at 52' to bring this temperature down to about 800°, read at point 73, and the mixed oil is heated from this point to the required maximum temperature as it flows through the final passes of the coil. This injection of oil and heating is controlled to give the desired cracking temperature which is read at point 69". The injection of the oil at point 52' checks the cracking of the main stream of oil and also causes a cracking of the injected oil. It also controls the thermal effects as described previously.

Oil may also be injected into line 41 just the other side of the cracking coil in order to control the temperature of the oil passing to the carbon catcher or to the evaporator. This will also crack the injected oil as a result of the heat abstracted from the main stream. Oil may also be injected via 52". This controls the cracking in the final tube or tubes and also acts to crack the injected oil. As previously this cracking is also affected by the "shock" phenomenon.

The oil passing through heat exchanger C is cooled down by the oil passing through heat exchamber via lines 36 and 37. By-pass 54 is controlled so that the amount of oil passing through C via lines 36 and 37 shall be such that the oil passing through the evaporator shall not be cooled down below its proper vaporization point which may be 600° F. This temperature is required to insure as complete a vaporization as possible and to limit the amount of residue in the evaporator.

While I have shown the oil injected into the final passes as being of the same character as that passed to the coils 39 and 40, this is only one way in which I may operate. I may inject a different oil, as for instance a heavier oil which is thus more easily cracked by the contained heat of the main stream of cracked oil. This injected oil may be a partially cracked oil or uncracked oil. This injected oil may be such that on cracking will yield a quantity of oil useful as recycle oil. It may be for instance be crude oil or a fuel oil. I prefer, however to produce oil by the method herein described.

The above description is not to be taken as limiting of my invention, but merely illustrative of the best method of using my invention, which I claim to be:

1. A continuous process of cracking and distilling hydrocarbon oil which comprises passing the oil under pressure to and through a coil, heating said coil by gases of combustion to crack the oil; passing other oil through another coil; heating said last mentioned coil by waste gases of combustion resulting from the heating of the first mentioned coil; fractionating said second mentioned oil into several fractions and injecting a portion of the heavier distillate fraction thus formed into the first mentioned coil in the desired quantity into the final passes thereof, to prevent excessive decomposition of the hot oil therein, and to crack the injected oil to the desired degree.

2. A continuous process for cracking and distilling oil which comprises heating oil under pressure, to a cracking temperature in a coil in the relatively hot section of a furnace; vaporizing the oil fractionating and condensing the vapors and withdrawing the condensate; heating and vaporizing a part of another oil in another coil in a relatively cooler section of said furnace; fractionating said other oil and separately withdrawing from the fractionating zone a residuum, a condensate and lower boiling hydrocarbon vapors; injecting a portion of said last named condensate into the final passes of the first mentioned coil; said final passes containing the hottest oil, to prevent over-cracking of the hot oil in said final passes, and cracking the cool injected oil by raising its temperature suddenly to a cracking degree.

3. A continuous process for cracking and distilling oil which comprises passing oil under pressure, sufficient to prevent any substantial vaporization, to and through a coil; heating the oil to a predetermined cracking temperature; vaporizing a portion of said oil and fractionating the vapors; condensing and withdrawing the lighter fraction; condensing the heavier fraction and returning a portion thereof to the coil for re-cracking; passing crude oil containing gasoline hydrocarbon fractions through a second coil situated in the path of waste combustion gases from the first mentioned cracking coil; vaporizing a portion of said oil and fractionating the vapors in a second fractionating zone; condensing and withdrawing the lighter fraction; condensing and cooling the heavier fraction and returning a portion of said heavier fraction to the final passes of the first mentioned coil, to prevent overcracking of the hot oil therein and to heat said heavier fraction to a cracking temperature.

4. A continuous process for cracking and distilling oil which comprises passing oil under pressure, sufficient to prevent any substantial vaporization, to and through a coil; heating the oil to a predetermined cracking temperature; vaporizing a portion of said oil and fractionating the vapors; condensing and withdrawing the lighter fraction; condensing the heavier fraction and returning a portion thereof to the coil for re-cracking; passing crude oil containing gasoline hydrocarbon fractions through a second coil situated in the path of waste combustion gases from the first mentioned cracking coil; vaporizing a portion of said oil and fractionating the vapors in a second fractionating zone; condensing and withdrawing the lighter fractions; condensing and cooling the heavier fraction and returning a portion of said heavier fraction to the outlet of the final passes of the first mentioned coil to prevent overcracking of the hot oil therein.

5. A continuous process of cracking and distilling hydrocarbon oil which comprises passing the oil under pressure to and through a coil, heating said coil in a furnace by gases of combustion to crack the oil, discharging from the coil the stream of cracked products into a separating zone wherein vapors and liquid residues are separated, passing other oil through another coil, heating said last mentioned coil by gases of combustion in the said furnace, separating the said second mentioned oil into several fractions differing with respect to their boiling point ranges and injecting a portion of a higher boiling fraction thus formed while below substantial cracking temperature into the outlet of the first mentioned coil in the desired quantity, to prevent excessive decomposition of the hot oil therein, and to crack the injected oil to the desired degree.

6. A continuous process for cracking and distilling oil which comprises passing oil under pressure, sufficient to prevent any substantial vaporization, to and through a coil in a heating zone, heating the oil to a predetermined cracking temperature, passing the oil from the coil into a separating zone wherein vapors and liquid separate, fractionating the separated vapors, condensing and withdrawing the lighter fraction, condensing the heavier fraction and returning a portion thereof to the coil for re-cracking, passing crude oil containing fractions suitable as cracking stock through a second coil heated by the said heating zone for the first mentioned cracking coil, vaporizing a portion of said oil and fractionating the vapors in a second fractionating zone, condensing and withdrawing the lighter fraction, condensing and cooling the heavier fraction and returning a portion of said heavier fraction to the final passes of the first mentioned coil to prevent overcracking of the hot oil therein and to heat said heavier fraction to a cracking temperature.

7. A continuous process for cracking and distilling oil which comprises passing oil under pressure, sufficient to prevent any substantial vaporization, to and through a coil heated by combustion gases, heating the oil to a predetermined cracking temperature, passing the oil from the coil into a separating zone wherein vapors and liquids separate, fractionating the separated vapors, condensing and withdrawing the lighter fraction, condensing the heavier fraction and returning a portion thereof to the coil for re-cracking, passing fresh oil containing hydrocarbon fractions suitable as a cracking stock through a second coil situated in the path of combustion gases employed in heating the said first mentioned cracking coil, vaporizing a portion of said oil and fractionating the vapors in a second fractionating zone, condensing and withdrawing a lighter fraction, condensing and cooling a heavier fraction, and returning a portion of said heavier fraction to the outlet of the final passes of the first mentioned coil to prevent overcracking of the hot oil therein.

8. A continuous process for cracking and distilling oil which comprises passing oil under pressure sufficient to prevent any substantial vaporization, to and through a coil, heating the oil to a predetermined cracking temperature, passing the oil from the coil into a separating zone wherein vapors and liquid residues are separated fractionating the separated vapors, condensing and withdrawing the lighter fractions, condensing the heavier fraction and returning a portion thereof to the coil for re-cracking, passing crude oil containing gasoline hydrocarbon fractions through a second coil situated in the path of gases employed in heating the first mentioned cracking coil, vaporizing a portion of said oil and fractionating the vapors in a second fractionating zone, condensing and withdrawing the lighter fractions, condensing and cooling the heavier fraction and returning a portion of said heavier fraction to the final passes of the first mentioned coil to prevent over-cracking of the hot oil therein and to heat said heavier fraction to a cracking temperature.

9. A process of distilling and converting hydrocarbon oils which comprises passing hydrocarbon oil through a pipe coil heated by hot combustion gases where it is subjected to cracking under a relatively high pressure, discharging the cracked highly heated oil from said coil into a relatively low pressure separating zone, passing evolved vapors from said separating zone to a fractionating operation wherein heavier constituents of said vapors are condensed as reflux condensate and thereby separated from desired lighter constituents of said vapors, withdrawing said reflux condensate from said fractionating operation and forcing it through said coil whereby it is subjected to cracking and subsequently passed to said vaporizing zone, simultaneously passing another oil through a separate coil exposed to combustion gases employed in heating said first-named coil and heating it during its flow therethrough to a distilling temperature, discharging the heated oil from the latter coil into a separate combined vaporizing and fractionating zone wherein higher boiling constituents of said oil are separated and collected in liquid form and desired lower boiling constituents are separated in vapor form, separately withdrawing the said separated desired low boiling products, and withdrawing from the vaporizing and fractionating operation separated higher boiling liquid products and introducing at least a portion of them while at below substantial cracking temperature into the stream of oil undergoing cracking at a point substantially intermediate the latter portion of said cracking coil and said first-named separating zone to check cracking of the said oil stream.

10. The process of distilling and converting hydrocarbon oils which comprises passing hydrocarbon oil through a pipe coil heated by hot combustion gases wherein it is subjected to cracking under a relatively high presure, discharging the cracked highly heated oil from said coil into a relatively low pressure separating zone, passing evolved vapors from said separating zone to a fractionating operation wherein heavier constituents of said vapors are condensed as reflux condensate and thereby separated from desired lighter constituents of said vapors, withdrawing said reflux condensate from said fractionating operation and forcing it through said coil whereby it is subjected to cracking and subsequently passed to said vaporizing zone, simultaneously passing another oil through a separate coil exposed to combustion gases employed in heating said first-named coil and heating it during its flow therethrough to a distilling temperature, discharging the heated oil from the latter coil into a separate combined vaporizing and fractionating zone wherein higher boiling constituents of said oil are separated and collected in liquid form and desired lower boiling constituents are separated in vapor form, separately withdrawing the said separated desired low boiling products, and withdrawing from the latter vaporizing and fractionating operation separated higher boiling liquid products and introducing at least a portion of them at below cracking temperature into the stream of cracked products issuing from said first-named coil prior to their discharge into said first-named separating zone to prevent overcracking of the said stream of cracked products.

11. A continuous process for cracking and distilling oil which comprises heating oil under pressure to a cracking temperature in a coil in the relatively hot section of a furnace, passing the oil from the coil into a separating zone wherein vapors and liquid residues are separated, fractionating and condensing the separated vapors and withdrawing the condensate, heating and vaporizing another oil in another coil in a relatively cooler section of said furnace, fractionating the said second mentioned oil and separately withdrawing a residuum, a condensate and lower boiling hydrocarbon vapors, collecting the low boiling hydrocarbon vapors and injecting a portion of said condensate into the outlet of the final passes of the first mentioned coil to prevent overcracking of the hot oil therein.

12. A continuous process for cracking and distilling oil which comprises heating oil under pressure to a cracking temperature in a coil in the relatively hot section of a furnace, passing the oil from the coil into a separating zone wherein vapors and liquid residues are separated, fractionating and condensing the separated vapors and withdrawing the condensate, heating and vaporizing another oil in another coil in another section of said furnace, fractionating the second mentioned oil to separate it into a plurality of fractions, and injecting a portion of a heavier fraction of the said second mentioned oil at below substantial cracking temperature into the outlet of the final passes of the first mentioned coil to prevent over-cracking of the hot oil, and cracking the injected oil by raising its temperature suddenly to a cracking degree.

13. The process of distilling and converting hydrocarbon oils which comprises passing hydrocarbon oil through a pipe coil heated by hot gases of combustion wherein it is subjected to cracking under a relatively high pressure, discharging the cracked highly heated oil from said coil into a relatively low pressure separating zone, passing evolved vapors from said separating zone to a fractionating operation wherein heavier constituents of said vapors are condensed as reflux condensate and thereby separated from desired lighter constituents of said vapors, simultaneously passing another oil through a separate coil exposed to combustion gases employed in heating said first-named coil and heating it during its flow therethrough to a distilling temperature, discharging the heated oil from the latter coil into a separating zone, passing separated vapors from the latter zone to a fractionating zone wherein higher boiling constituents thereof are separated as reflux condensate, combining the latter reflux condensate with the said reflux condensate from said cracked vapors, passing a portion of the condensate mixture through said cracking coil as charging stock therefor, and introducing another portion of said condensate mixture at below substantial cracking temperature into the stream of cracked products issuing from said cracking coil prior to their discharge into said low pressure separating zone.

JOHN C. BLACK.